United States Patent [19]
Fewkes

[11] 3,993,819
[45] Nov. 23, 1976

[54] CHANNEL-SHAPED SEALING, FINISHING AND GUIDE STRIPS AND METHODS OF MAKING THEM

[75] Inventor: Graham H. Fewkes, Wolston, near Coventry, England

[73] Assignee: Draftex Development A.G., Switzerland

[22] Filed: Jan. 17, 1975

[21] Appl. No.: 542,088

[30] Foreign Application Priority Data
Jan. 23, 1974 United Kingdom................ 3052/74

[52] U.S. Cl................................ 428/136; 49/490; 52/716; 428/138; 428/358; 428/457; 428/465
[51] Int. Cl.².................. E06B 7/18; E06B 7/22; E04F 19/02; B32B 15/06
[58] Field of Search................... 49/490, 495, 491; 52/716; 428/358, 134–136, 138–140, 462, 463, 465, 457

[56] References Cited
UNITED STATES PATENTS

| | | | |
|---|---|---|---|
| 2,986,793 | 6/1961 | Bright | 49/490 X |
| 3,044,918 | 7/1962 | Wagner | 428/135 |
| 3,065,785 | 11/1962 | Taber | 428/135 X |
| 3,167,856 | 2/1965 | Zoller | 29/413 |
| 3,256,577 | 6/1966 | Bright | 49/491 X |
| 3,310,928 | 3/1967 | Weimar | 52/716 |
| 3,655,501 | 4/1972 | Tesch | 428/136 |
| 3,706,628 | 12/1972 | Azzola | 428/358 X |
| 3,825,465 | 7/1974 | Stock | 428/135 |

*Primary Examiner*—Harold Ansher
*Attorney, Agent, or Firm*—Leydig, Voit, Osann, Mayer & Holt, Ltd.

[57] ABSTRACT

A reinforcing carrier for a flexible channel-shaped sealing, finishing, or guide strip is disclosed, comprising a series of U-form elements arranged side-by-side to define a channel, the legs of the elements being interconnected by means of short connecting links each of which extends from a point on a leg of one element to a point on the corresponding leg of the adjacent element. The two attachment points for each leg are at different distances from the base of the channel so that each connecting link is slanted with respect to the legs of the U-form element. Each leg has substantially the same flexibility at each of its points of attachment to the two legs which it interconnects, thus giving the carrier good flexibility about the longitudinal axis of the channel. The carrier is covered with resilient covering material to form the sealing, finishing or guide strip. The carrier may be produced by slitting and stretching the metal blank and then bending it into U-form.

4 Claims, 3 Drawing Figures

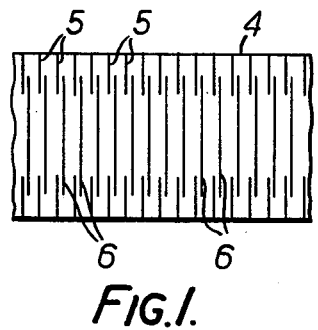
Fig./.
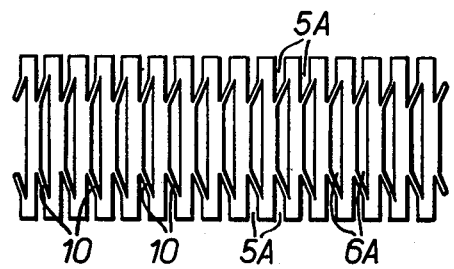
Fig.2.
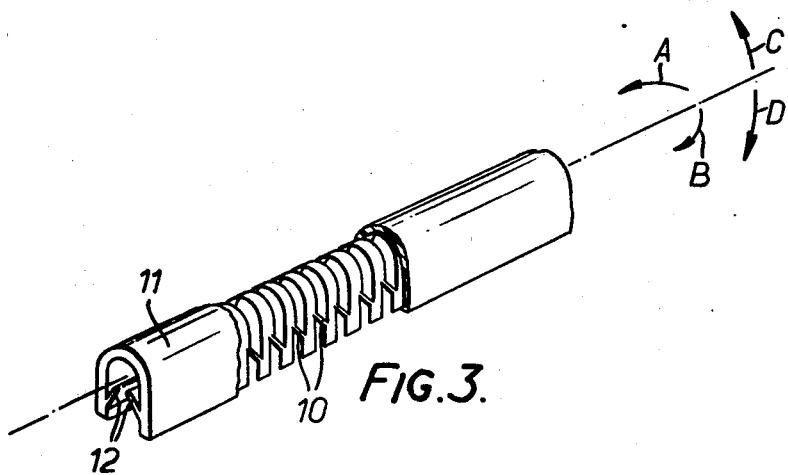
Fig.3.

CHANNEL-SHAPED SEALING, FINISHING AND GUIDE STRIPS AND METHODS OF MAKING THEM

BACKGROUND OF THE INVENTION

The invention relates to flexible channel-shaped sealing, finishing and guide strips for use as draft excluding seals, beadings, window channels, flange finishers (for covering welded flanges for example), and the like, and more particularly to reinforcing cores or carriers for such strips. Such strips are herein referred to generically as "sealing strips", and are particularly, though not exclusively, for use in vehicle construction.

Reinforcing cores or carriers for sealing strips are known comprising a series of U-form elements arranged side-by-side to define a channel with each leg of each element being connected to the adjacent leg of the next element by a short connecting link which extends parallel to the longitudinal extension of the channel. Such a reinforcing carrier is unsatisfactory in that it has only limited flexibility. While it may be flexible in a plane passing through the base of the channel and parallel to the channel sides, its flexibility in the perpendicular plane is extremely limited or non-existent and in fact can only take place by buckling of the connecting links. This is clearly unsatisfactory.

Reinforcing carriers for sealing strips are also known which again comprise a series of U-form elements arranged side-by-side to define a channel and which, in the finished sealing strip, are covered by a covering or coating of flexible and resilient material but are spaced apart and disconnected from each other within the covering. Such an arrangement gives improved flexibility but it is normally necessary for the carrier elements to be connected to each other before they are covered with resilient covering material and this therefore involves an additional step for breaking the connections between the carrier elements.

It is an object of the invention to provide an improved reinforcing core or carrier for a sealing strip.

It is a more specific object of the invention to provide a reinforcing core or carrier for a sealing strip which comprises a series of U-form elements which are connected to each other but nevertheless enable the carrier to have substantial flexibility.

It is another object of the invention to provide an improved sealing strip.

A further object of the invention is to provide improved methods of making reinforcing carriers for sealing strips and sealing strips incorporating such carriers.

SUMMARY OF THE INVENTION

According to the invention, there is provided a reinforcing carrier for a flexible channel-shaped sealing, finishing or guide strip, comprising a series of U-form elements arranged side-by-side to define a channel, the legs of the elements being interconnected by means of short connecting links each of which extends from a point on a leg of one element to a point on the corresponding leg of the adjacent element, the two said points being at different distances from the base of the said channel and at each such point there being substantially equal flexibility between the elements and connecting links.

There is also provided a sealing strip incorporating such a carrier.

According to the invention, there is further provided a method of making a reinforcing carrier for a flexible channel-shaped sealing, finishing or guide strip, comprising the steps of taking a substantially rectangular thin blank, forming therealong and therethrough a series of parallel apertures each of which extends across the width of the blank and terminates short of the lateral edges of the blank, forming marginal slots along the lateral edges of the blank with each such slot extending inwardly from a respective lateral edge of the blank to terminate short of the material bounding the laterally outward ends of a respective one of the apertures, each aperture being substantially aligned across the blank with two said slots, and the slots and apertures being so shaped that the portions of the blank between them are of constant width and inclined to the longitudinal axis of the blank, and bending the blank into a U-form about its longitudinal axis.

According to the invention, there is also provided a method of producing a flexible channel-shaped sealing, finishing, or guide strip, comprising the steps of forming a first series of parallel slits in a thin, rectangular, metal blank, each slit of the first series terminating short of the lateral edges of the blank, forming a second series of slits in the blank each extending inwardly from a respective one of the lateral edges of the blank so that each slit of the second series lies between, is parallel to and overlaps a pair of adjacent slits of the first series but is closer to one of the said pair of slits than the other, longitudinally stretching the slit blank so as to expand the widths of the slits and thereby produce a series of transverse metal elements interconnected by connecting links which are formed by the metal between the overlapping portions of each slit of the second series and the said one of the corresponding pair of slits of the first series and which are inclined to the longitudinal axis of the blank, and forming the stretched blank into U-form along its longitudinal axis, a covering of flexible resilient material being applied over the blank after the stretching thereof.

BRIEF DESCRIPTION OF THE DRAWINGS

A sealing strip embodying the invention, a reinforcing carrier embodying the invention for a sealing strip, and methods according to the invention of making sealing strips and reinforcing carriers therefor, will all now be described, by way of example only, with reference to the accompanying diagrammatic drawings in which:

FIG. 1 is a plan view of one of the carriers, at an early stage in manufacture;

FIG. 2 is a plan view of the carrier of FIG. 1, at a later stage; and

FIG. 3 is a perspective view of a sealing strip incorporating the carrier of FIGS. 1 to 3 but with its covering partially broken away.

DESCRIPTION OF PREFERRED EMBODIMENTS

As shown in FIG. 1, the carrier is made from a thin blank 4, such as metal, which is then provided with cross slits 5 and 6. As shown, the slits 5 extend across the blank for a short distance from its lateral edges, while the slits 6 are considerably longer, terminate short of the lateral edges of the blank, and are interdigitated with and overlap the slits 5. As shown in FIG. 1, each long slit 6 is closer to the adjacent slits 5 on one of its sides than to the adjacent slits 5 and 6 on the opposite side.

The slit blank of FIG. 1 is then subjected to a stretching or extension process, as by passing it through spaced pairs of rollers running at different speeds, and the effect is to stretch the slit blank into the form shown in FIG. 2. Here, the blank comprises a series of transverse elements 8 which are interconnected by short connecting links 10. The connecting links 10 are of course formed by the material lying between each short slit 5 (FIG. 1) and the adjacent slit 6, and are inclined to the longitudinal axis of the blank as shown in FIG. 2. The stretching process inevitably tends to bend the blank out of its original plane, and it may therefore be subjected to a rolling process to flatten it.

The method of production described above is advantageous in that it ensures maximum usage of metal. Instead, however, the carrier in the form shown in FIG. 2 could be directly produced by piercing out the unwanted metal portions by means of a press and die to produce slits 5A and apertures 6A.

The carrier of FIG. 2 is then covered with a coating or covering 11 of textile material or elastomeric or plastics material or any combination of such materials, and is then bent into U-form as shown in FIG. 3. Advantageously, the outer surface of at least one side of the covering material is embossed to improve its appearance and the inside legs of the U may carry longitudinally extending lips 12 which in use help to secure the sealing strip to a flange. The lips 12 will of course be omitted if the sealing strip is to form a window channel or the like.

If the sealing strip is to act as a draft excluder, then a soft rubber tube may be secured to the strip to run along the outside of one leg of the U.

The inclined arrangement of the connecting links 10 is advantageous in that it greatly increases the flexibility of the sealing strip in the directions of the arrows A and B, as compared with the flexibility available when the connecting links are parallel to the longitudinal axis of the strip; at the same time, however, the flexibility in the directions of the arrows C and D is unimpaired.

It will be appreciated that by increasing the lengths of the slits 5 and correspondingly decreasing the lengths of the slits 6, the inclined links 10 can be moved inwardly of the carrier, that is, towards the centre of the base of the U in the final strip. Conversely, by increasing the lengths of the slits 6 and correspondingly decreasing the lengths of the slits 5 the connecting links 10 can be moved outwardly towards the lateral edges of the carrier, that is, to the distal ends of the legs of the U in the final strip.

It will be appreciated that there is substantially equal flexibility at the two points where each connecting link 10 is attached to the two elements between which it extends. It is this substantially equal flexibility which allows the carrier to bend readily in the directions of the arrows A and B. The substantially equal flexibility is achieved because each link 10 is narrow and the geometry at each of its two points of attachment is the same.

What is claimed is:

1. A reinforcing carrier for a flexible channel-shaped sealing, finishing or guide strip, comprising
    a series of U-form elements each having a base merging into and integral with two substantially straight and parallel legs, the elements being arranged side-by-side to define a channel, and
    two substantially straight connecting links interconnecting each element with the next adjacent element, each connecting link being substantially shorter than each leg of the elements and extending in a straight line directly from a point on a leg of one element to a point on the corresponding leg of the adjacent element, the two said points being at different distances from the distal ends of the legs so that the connecting links are inclined to the direction of extension of the legs, and at all said points there being substantially the same flexibility between the respective leg and link.

2. A carrier according to claim 1, in which the directions of extension of the connecting links between adjacent U-form elements are all substantially parallel.

3. A flexible channel-shaped sealing, finishing or guide strip, incorporating a reinforcing carrier according to claim 1 which is covered with flexible and resilient covering material.

4. A flexible channel-shaped sealing, finishing or guide strip, comprising
    a plurality of similar metallic U-form elements placed side-by-side and each having a base merging into two substantially straight and parallel legs,
    a plurality of substantially straight connecting links each integral with and extending directly from a respective leg of one said element to the adjacent leg of the next element, each connecting link being substantially shorter than each leg of the elements and being slanted with respect to the direction of extension of the legs of the elements, and all the links being connected to the respective said legs with substantially the same flexibility, and
    a covering of flexible resilient material over the elements and connecting links.

* * * * *